Jan. 18, 1938. J. A. J. BENNETT ET AL 2,105,682
AIRCRAFT HAVING ROTATIVE SUSTAINING WINGS
Filed Sept. 13, 1935    8 Sheets-Sheet 4

INVENTORS
Frederick Leighton Hodges
James Allan Jamieson Bennett
BY
Synnestvedt & Lechner
ATTORNEYS Jan. 18, 1938.  J. A. J. BENNETT ET AL  2,105,682
AIRCRAFT HAVING ROTATIVE SUSTAINING WINGS
Filed Sept. 13, 1935  8 Sheets-Sheet 5
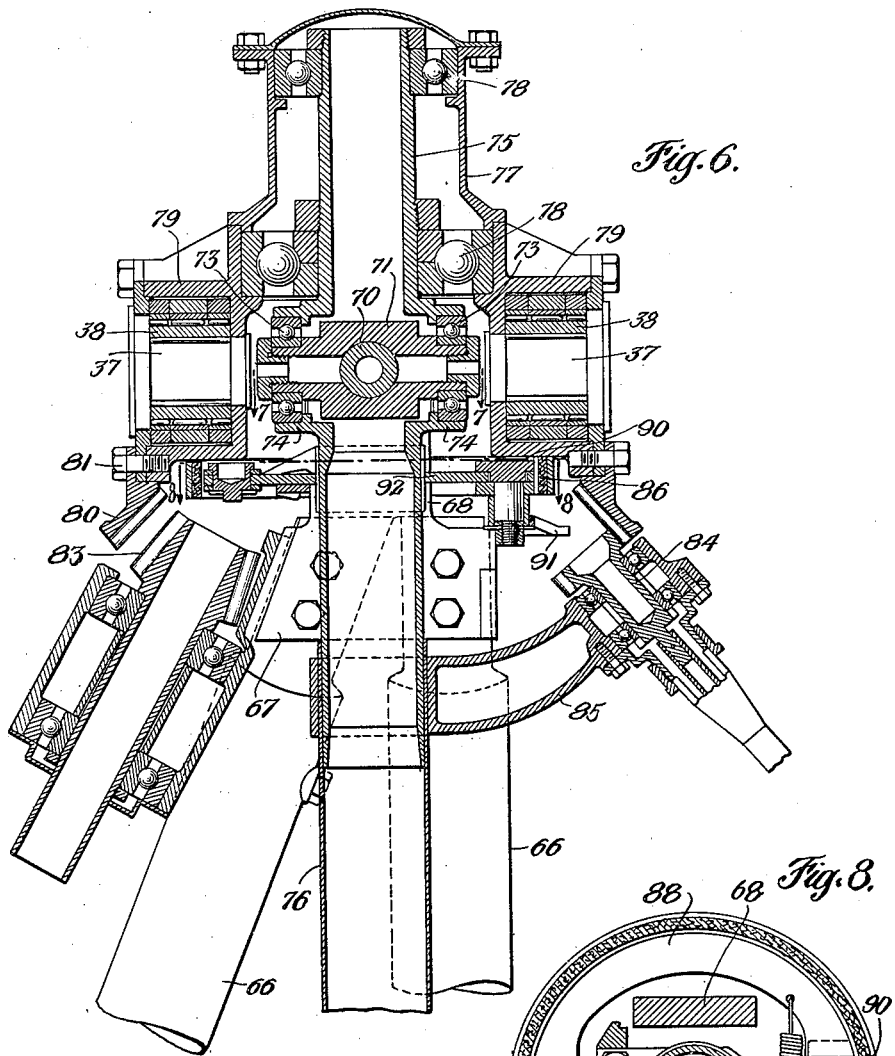
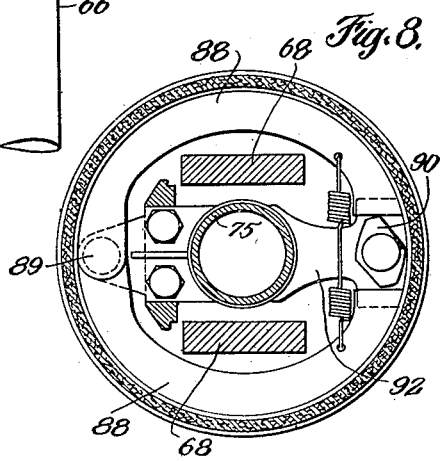
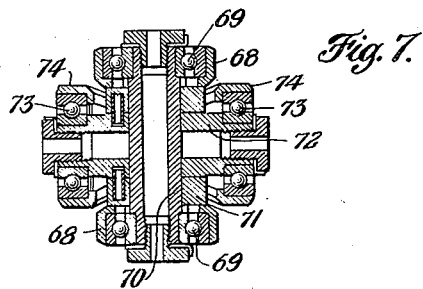

Jan. 18, 1938.   J. A. J. BENNETT ET AL   2,105,682
AIRCRAFT HAVING ROTATIVE SUSTAINING WINGS
Filed Sept. 13, 1935   8 Sheets-Sheet 7

INVENTORS
Frederick Leighton Hodges
James Allen Jamieson Bennett
BY
Synnestvedt & Lechner
ATTORNEYS

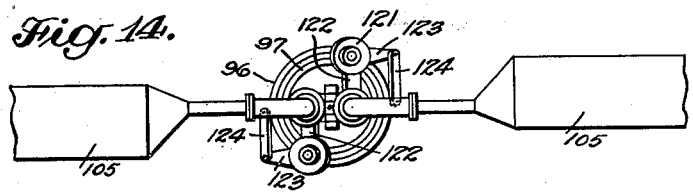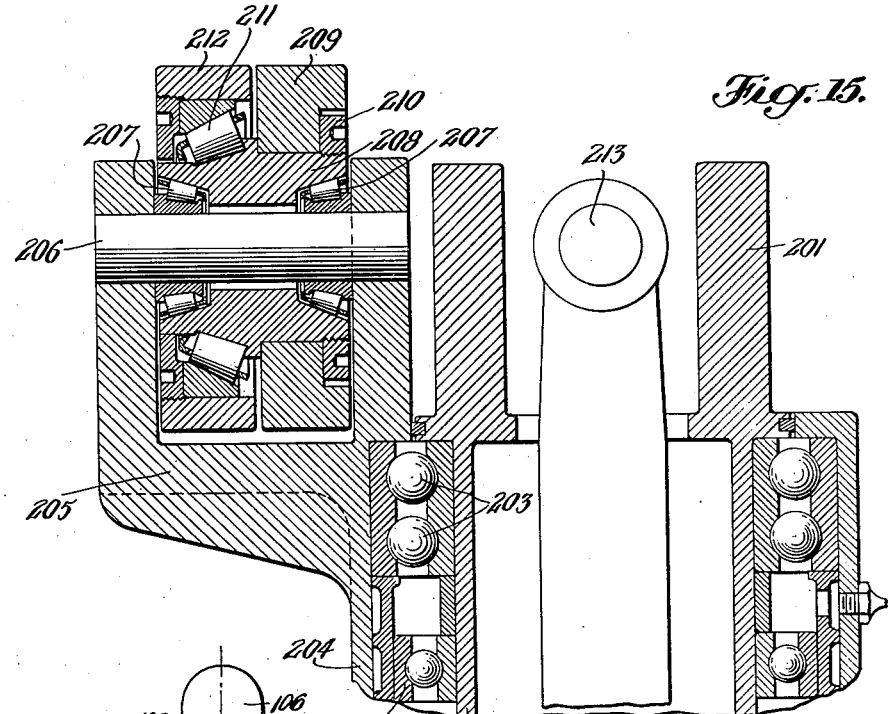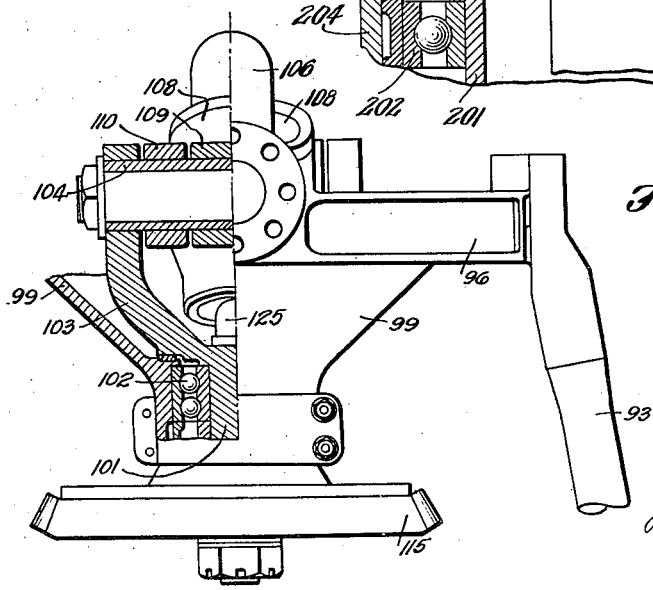

UNITED STATES PATENT OFFICE 2,105,682

AIRCRAFT HAVING ROTATIVE SUSTAINING WINGS

James Allan Jamieson Bennett, Genista, Newton Mearns, and Frederick Leighton Hodgess, Clarkston, Scotland, assignors to Autogiro Company of America, Willow Grove, Pa., a corporation of Delaware Application September 13, 1935, Serial No. 40,386
In Great Britain September 17, 1934

33 Claims. (Cl. 244—18)

This invention relates to aircraft having rotative sustaining wings, preferably normally autorotationally actuable by relative airflow in flight. The invention is more particularly concerned with the mounting and hub structure and associated parts of an autorotative sustaining rotor of this general type.

One of the primary objects of the invention is to minimize roughness and vibration incident to rotor operation and to reduce the transmission of such vibrations to the control element. In further explanation, it is pointed out that in sustaining rotors of the type in question, the rotor blades are pivoted or otherwise flexibly mounted on a hub structure in a manner to provide freedom for "flapping" movements of the blades, i. e., movements of the blades in paths generally transverse the mean rotational path. We have found that roughness or vibration incident to rotor operation is, at least in large part, a result of individual flapping movements of the wings on their mounting pivots, as heretofore constructed. The present invention provides an improved mounting pivot arrangement which substantially reduces transmission of such vibrations or roughness to the rotor hub member and from there to the body of the craft.

It is additionally pointed out that rotor blades of the character here under consideration are customarily pivotally attached to a hub device which, in turn, according to present preferred practice is pivotally mounted on a pylon structure so as to provide freedom for tilting movements of the rotor hub in all directions for control purposes. The present invention is of especial advantage when used in a rotor of this type, since it substantially eliminates the transmission of rotor vibrations or roughness to the control member by means of which the hub is tilted.

A further object of the invention is the arrangement of one or both of the rotor tilting pivots as well as the flapping pivots for the blades with their axes either intersecting or passing close to the axis of the rotor hub and further with the rotor tilting pivots located adjacent to or in that plane perpendicular to the axis of the hub which contains the flapping pivots. In this way the effort required to effect tilting control movements is minimized. The invention also provides for the positioning of additional individual blade pivots, such as "drag" pivots, relatively close to the axis of the hub. It should be understood, however, that, as to most of these features, the invention is applicable to a sustaining rotor system whether or not the blades are provided with drag pivots.

Still further, the invention has in view minimizing friction in the pivot assemblies provided for flapping movements of the blades, this being of considerable importance in reducing roughness and vibration.

The foregoing, as well as other objects and advantages which will occur to those skilled in the art, are considered more in detail especially in connection with the accompanying drawings which illustrate several embodiments of the invention, as follows—

Figure 1:
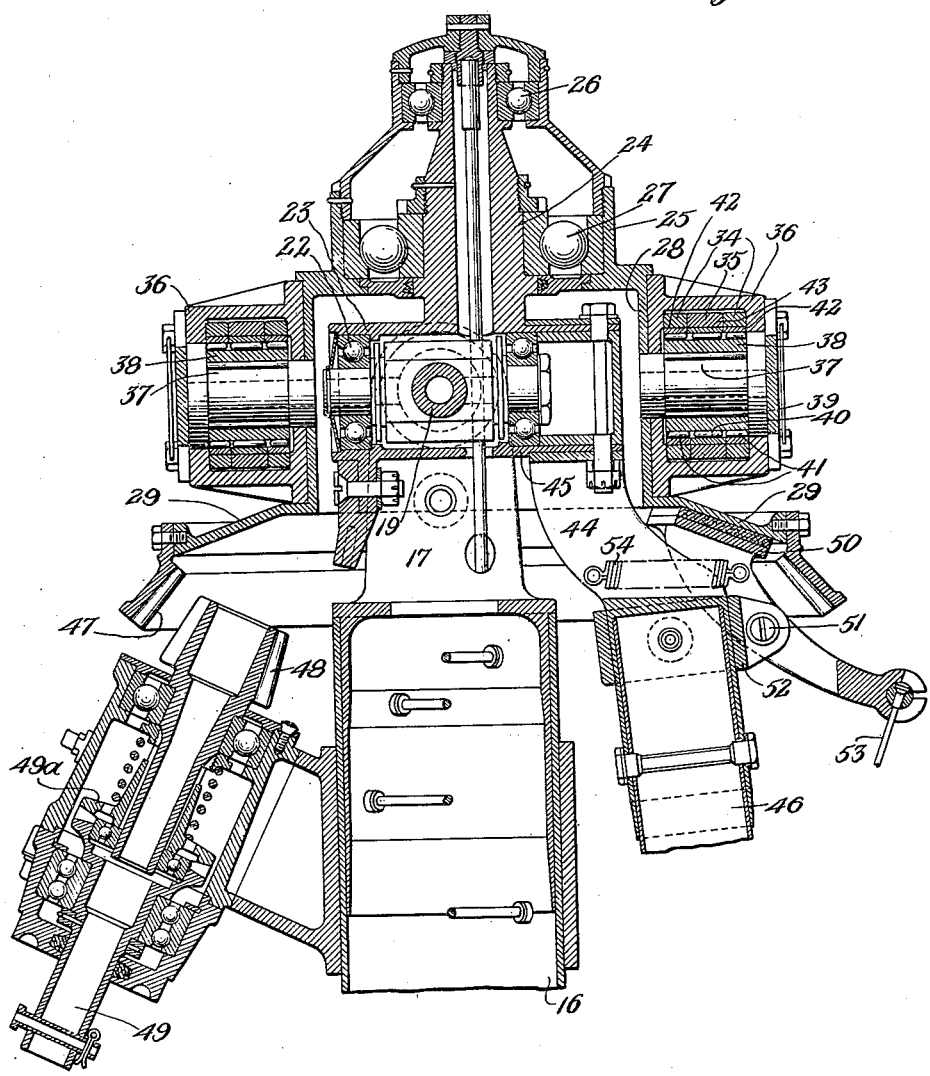
Figure 1 is a vertical, longitudinal, sectional view of a rotor hub and associated parts, constructed in accordance with this invention.
Figure 2:
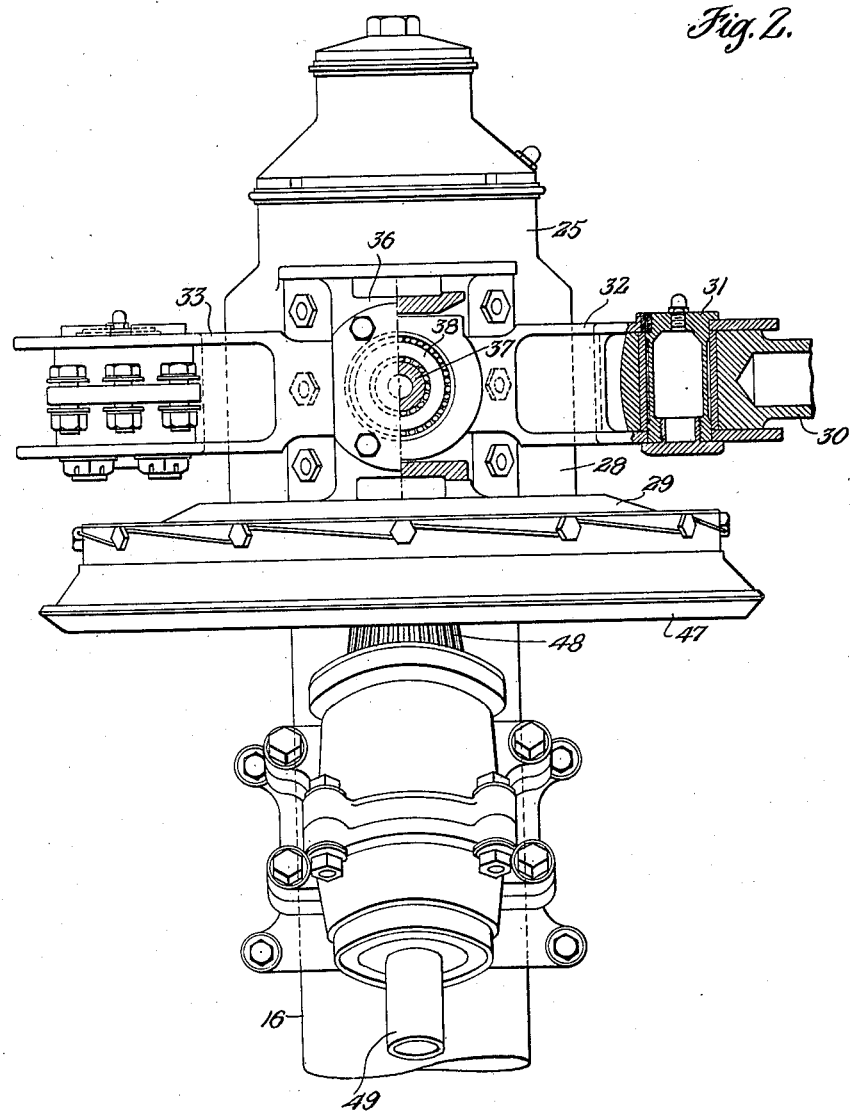
Figure 2 is a front elevational view of the structure shown in Figure 1, with certain parts shown in section.
Figure 3:
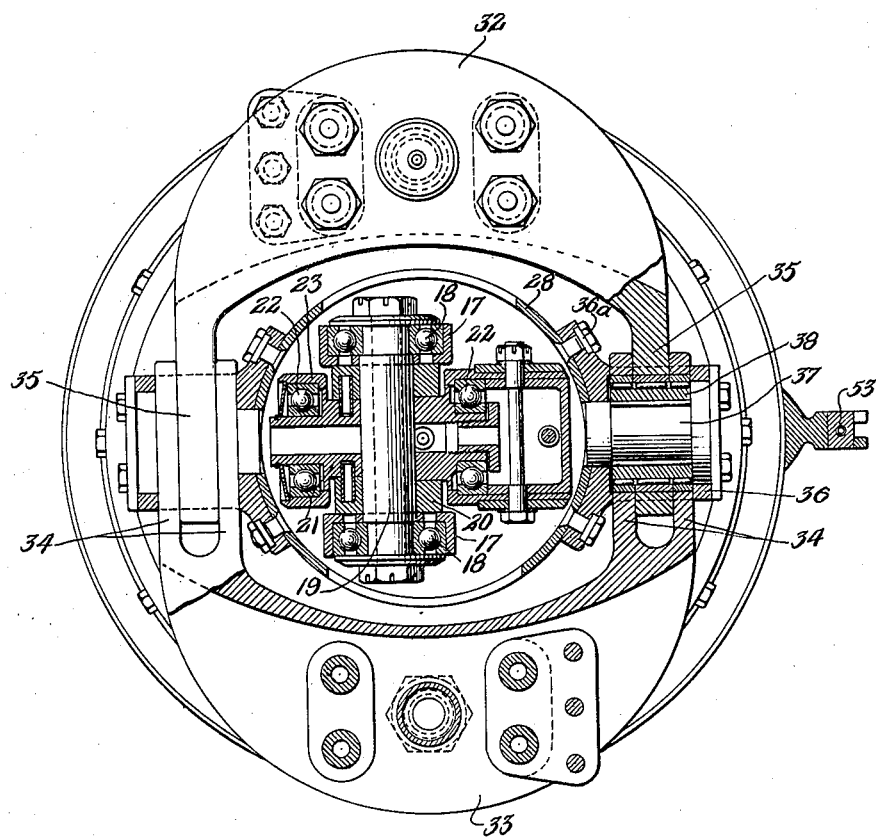
Figure 3 is a top view, partly in plan and partly in section, of the structure of Figures 1 and 2.
Figure 4:
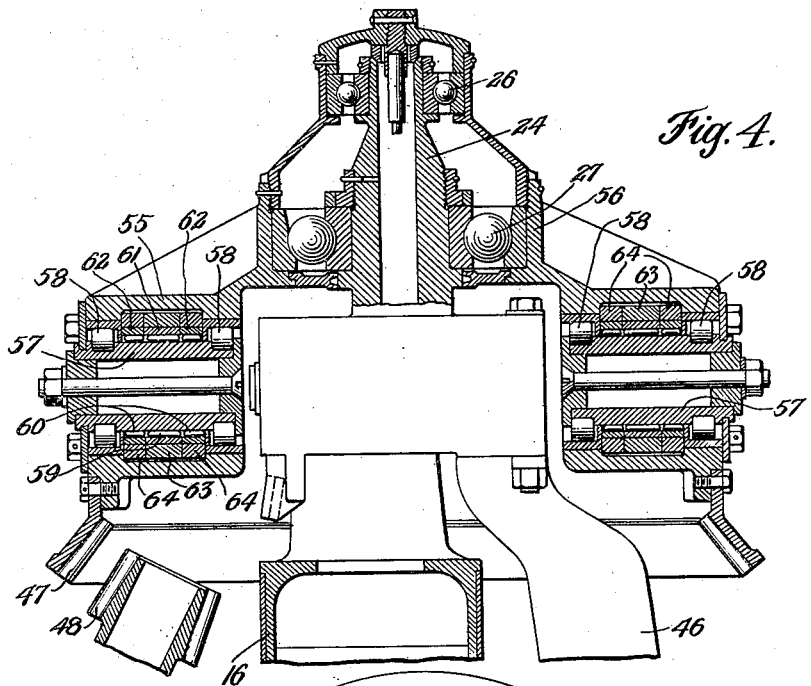
Figure 5:
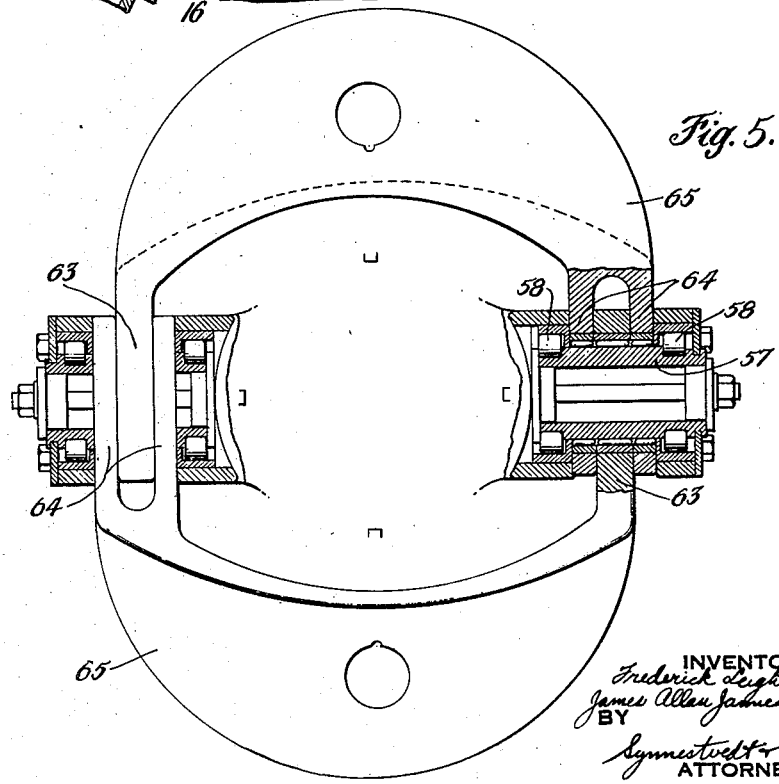
Figure 9:
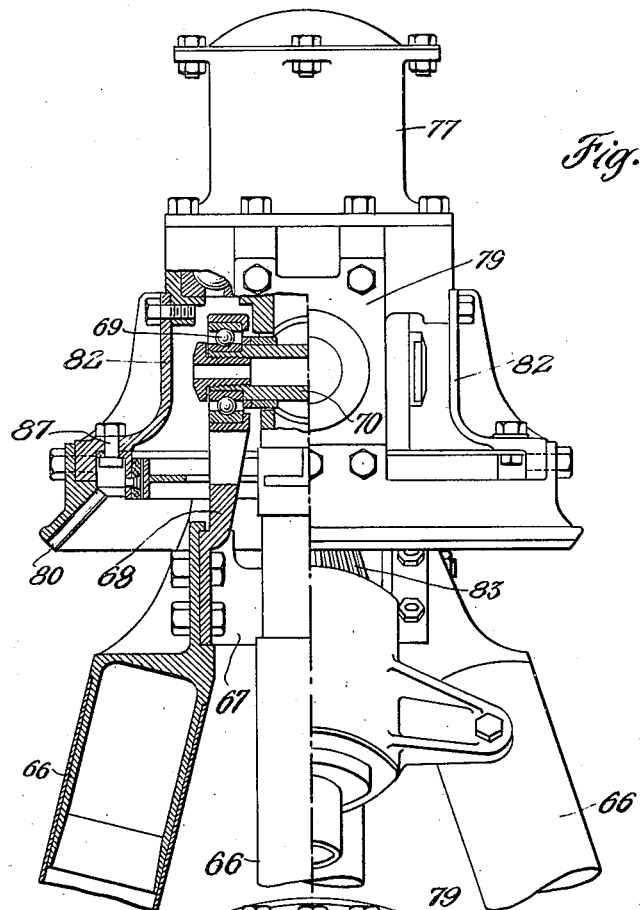
Figure 10:
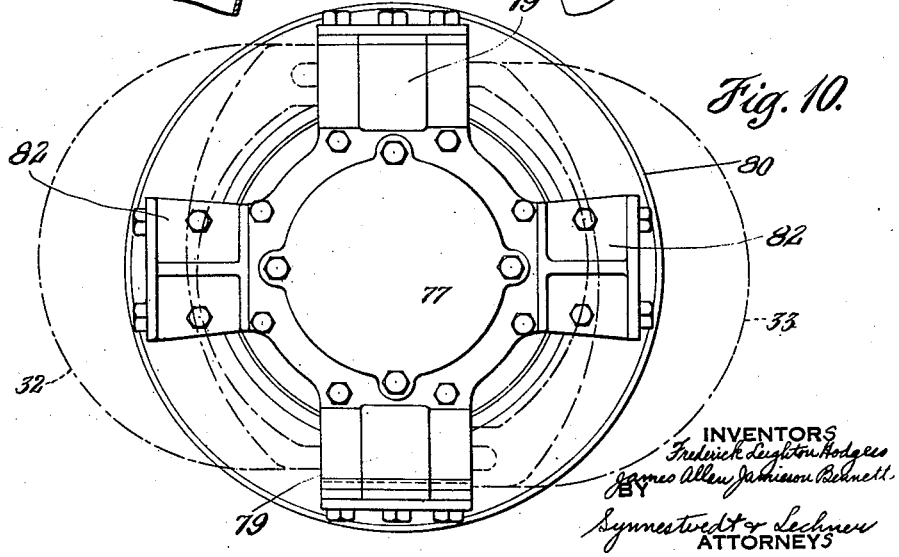
Figure 11:
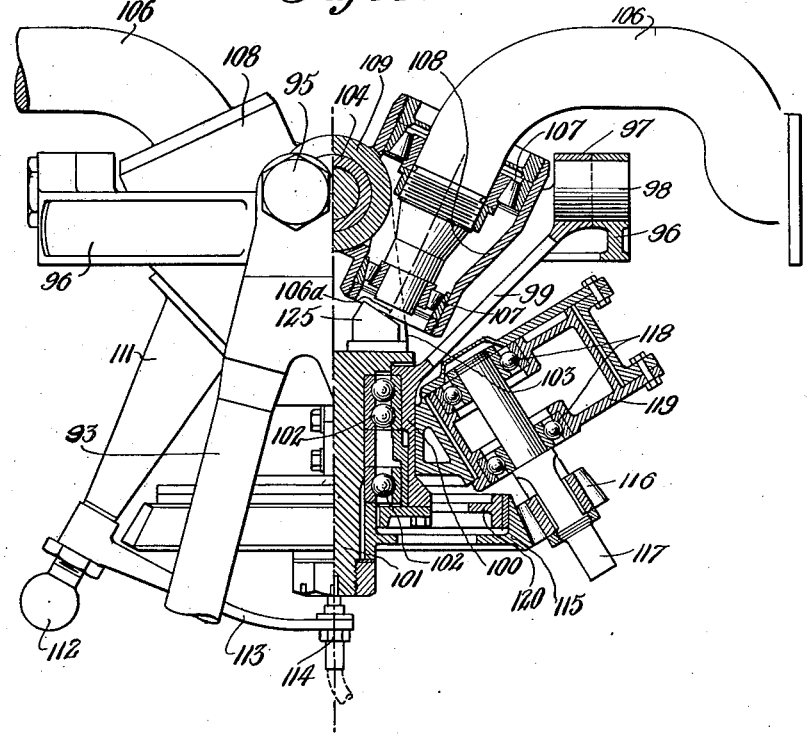
Figure 12:
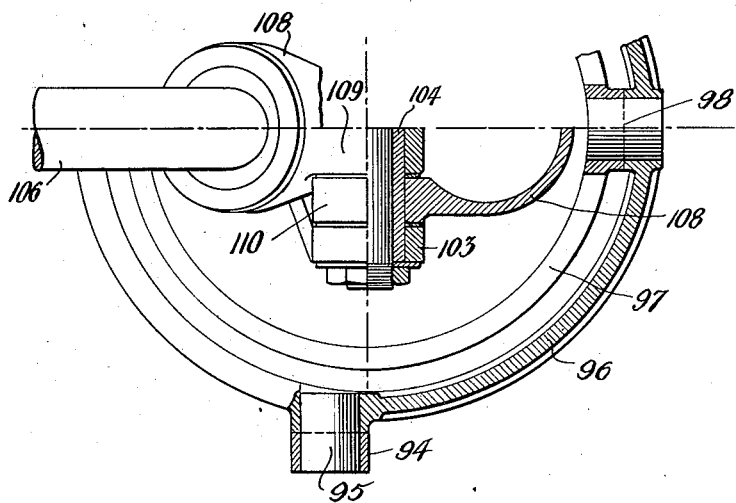

Figures 4 and 5 illustrate a modification of certain portions of the structure shown in Figures 1, 2 and 3, Figures 4 and 5 being taken similarly to Figures 1 and 3, respectively, but omitting certain structure which would be duplicated;

Figure 6 is a view similar to Figure 1 of an alternative form of construction;

Figures 7 and 8 are horizontal, sectional views taken as indicated by the section lines 7—7 and 8—8, respectively, on Figure 6;

Figure 9 is a front view of the structure of Figure 6, with certain parts shown in section;

Figure 10 is a top plan view of the arrangement of Figures 6 to 9 inclusive;

Figure 11 is a side view of a still further modified rotor hub assembly incorporating features of this invention, a portion of this figure being in elevation and the remainder in section;

Figure 12 is a fragmentary top view, partly in plan and partly in section, of portions of the structure in Figure 11;

Figure 13 is a rear elevational view of the arrangement of Figure 11, with parts shown in section and certain structure omitted;

Figure 14 is a somewhat diagrammatic top plan view of a rotor hub assembly in accordance with Figures 11, 12 and 13, to which is applied certain devices for control or damping blade movements on their drag pivots; and Figure 15 is a partial view in vertical section of the rotor hub and blade mounting of a further alternative form of construction, duplicate parts being omitted for clearness.

The improved rotor hub structure of the present invention is adapted to be incorporated in an aircraft of the autorotative rotary wing type having the usual body, undercarriage, controls, and power plant driving a propulsive airscrew, and preferably provided with a disengageable transmission extended from the power plant to the rotor for the purpose of imparting torque thereto, for example, preparatory to making a take-off. Since features of the type just mentioned form no part of the present invention per se, they are not illustrated herein, but reference may be had, if desired, to British Patent No. 393,976 or the corresponding United States application No. 645,985, filed December 6th, 1932, for a full disclosure of this general type of craft.

While certain features of the invention, particularly the flapping pivot assemblies for the blades, may be employed to advantage in an autorotative sustaining rotor which is not tiltably mounted for control purposes, this latter arrangement is preferable, and we have, therefore, illustrated the invention in all forms as applied to a rotor hub incorporating means for tilting the hub in all directions so as to provide both lateral and longitudinal control.

In the arrangement illustrated in Figures 1 to 3, a fixed rotor support takes the form of a single tubular mast 16. A fitting at the upper end of this mast is provided with a pair of upstanding and apertured lugs 17 having recesses adapted to receive roller bearings 18 for mounting pivot pin 19 serving as the pivot for fore and aft tilting movements of the rotor hub. A member 20 fitting between the lugs 17 is apertured to receive the pin 19 and is keyed to an additional pivot device 21 at the ends of which roller bearings 22 are arranged, these bearings also being mounted in recesses formed in lateral extensions 23 at the lower end of the upright axis member 24. The pivot 21 serves to provide for tilting movements of the rotor hub laterally of the craft. The rotor hub proper comprises an upper portion 25 rotatably mounted as by means of bearings 26 and 27 on the spindle 24. The hub member further has a depending cylindrical part 28 which is flared outwardly toward the bottom as at 29.

While certain features of this invention may be adapted to sustaining rotors having any desired number of blades, the structure is especially applicable to rotors having an even number of blades. In this connection it is further pointed out that it has been found that a two-bladed rotor, as heretofore constructed, gives rise to considerably greater vibration difficulties than rotors with three or more blades. Since the present invention substantially reduces roughness, it is especially suitable for a two-bladed rotor, and we have illustrated the application thereof in the drawings to such a rotor. At the right of Figure 2, the root end of a blade appears at 30. While, as already noted, a drag pivot for the blade is not essential to all features of the invention, we have illustrated such a pivot at 31 in Figure 2. This pivot joins the root end 30 of the blade to the drag link 32, a similar link 33 being provided for the opposite blade. Both of these links are bifurcated so as to embrace the cylindrical part 28 of the hub, and one of them, 33, is provided with double-ended forks 34, the other being single-ended, as shown at 35. As appears in Figure 3, the single-ended forks 35 project between the fork elements 34 at each side of the hub.

The pivot assembly employed for the fork ends referred to just above includes a hollowed bracket 36 bolted to the hub part 28 as by studs 36a. A pivot pin 37 is fixedly mounted in this bracket and a floating sleeve 38 is, in turn, mounted on the pin 37 as by means of needle bearings 39. The lugs or fork ends 34 and 35 of both drag links (32 and 33) are all apertured to receive the bearing assembly described just above. The assembly further includes additional needle bearings 40 and 41 interposed between the floating bushing 38 and the fork elements 34 and 35, the needles of this set thus being divided into three groups so as to provide for free independent swinging of each blade with respect to the bushing 38. If desired, additional bearing bushings 42 and 43 may be fixed within the apertures in the fork elements 34 and 35 to bear upon the needle bearings.

From the foregoing it will be seen that, according to the present invention, the flapping pivot assembly common to a pair of oppositely disposed blades includes a floating intermediate bearing member (the floating bushing 38) which is freely rotatable on an additional bearing member or pin (37) which, in turn, is fixed relatively to the hub. The blade root members are thus rotatably mounted for independent flapping movement. The intermediate member or floating bushing receives the loads transmitted by both the oppositely disposed blades, and the opposed centrifugal loads neutralize one another in the intermediate member. The result is that unbalanced loads, chiefly of lift, are the only ones which are transmitted to the hub, and as a result of this substantially only the lift loads can give rise to friction transmitted to the hub at the flapping pivots. Such unbalanced loads and their friction are only a small fraction of the total, and the invention thus results in a very material reduction in roughness and a great improvement in the operation and "feel" of the controls.

The inner ends of the opposed drag links having a bearing on the floating bushings are preferably arranged symmetrically, as already described, with respect to each floating member, i. e., they are so arranged that the midpoints of the axial lengths of the bearing areas of the opposed drag links coincide, this arrangement being adopted so as to ensure that the opposed centrifugal loads truly neutralize one another and do not give rise to residual couples which are transmitted to the hub member and would give rise to friction between the floating members and the hub and to severe localized loading of the bearings.

Referring to Figure 1, it will be seen that a control member 44 is rigidly attached to the lower part 45 of the spindle structure. This member 44 is coupled with a downwardly extending control element 46 which is adapted to be connected to the control lever (not shown) by suitable means for reversing the motion of the control lever, so that a backward movement of the latter causes a forward movement of the control element 46 and vice versa, and similarly with reference to lateral movements to right and left.

With regard to the structure described above, further attention is called to the fact that the tilting pivots 19 and 21 are brought into the plane of rotation of the flapping pivots (i. e., the locus of the flapping pivot axes during rotation of the rotor). An advantage incident to this arrangement is that the transmission to the controls of vibrations originating in the rotor is substantially eliminated. In addition, the location of the flapping pivots to intersect the rotor axis, in conjunction with the disposition of the rotor tilting pivots in the plane of the flapping pivots, is further of advantage in reducing the control force which must be applied to the rotor in effecting maneuvers.

The arrangement of Figures 1, 2 and 3 further includes an internal bevel gear 47 which is attached, as clearly seen in Figures 1 and 2, to the flange 29 of the rotor hub. This gear is adapted to be meshed with a driving pinion 48 mounted at the upper end of a shaft 49 which latter is extended to the power plant or engine of the craft, preferably through a disengageable clutching element. When it is desired to mesh gears 47 and 48, the rotor hub is tilted forwardly on its transverse pivot 19 to an extreme position, and this brings the gear 47 down into mesh with gear 48.

The inside surface of the flange 29 is desirably employed for braking purposes. A cooperating brake shoe 50 pivotally mounted as at 51 to a support 52 carried by the control tube 46 is arranged so as to bear against the flange 29 by a downward pull of the actuating element 53. A return spring 54 serves to maintain the brake in release position.

From inspection of Figures 1, 2 and 3, it will also be seen that the tilting pivot 21 is positioned with its axis coincident with the axis of the pivot assemblies providing for flapping movement of the blades. It will further be observed that the tilting pivot 19, while located in the same plane as the flapping pivots and the pivot 21, is offset slightly forwardly from the upright axis of the rotor hub, this being done for reasons fully brought out in copending application Serial No. 645,985, of Juan de la Cierva, filed December 6, 1932.

In order to ensure at all times that the rotor may be free to overrun the power applied through the driving pinion 48 and shaft 49, the structure preferably includes an overrunning dog clutch 49a.

The general hub structure of the modification shown in Figures 4 and 5 is similar to that of Figures 1, 2 and 3. In this case, however, the pivot assemblies which provide the flapping pivots for the blades are somewhat modified. In these views the brackets 55 for receiving the pivot assemblies are formed integrally with the hub member 56. A pivot element or pin 57, preferably hollowed for lightness, is rotatably mounted as by bearings 58 in the bracket 55. Needle bearings 59 and 60 surround the pin 57, and this entire assembly, together with bushings 61 and 62, is inserted in the apertures of the fork ends 63 and 64.

As seen in Figure 5, this modification contemplates the employment of counterpart drag links 65—65, each having one end bifurcated and the other end of single construction, so that when assembled in the pattern shown in Figure 5 the single end of one projects between the elements of the double end of the other and vice versa. This arrangement is advantageous in that both drag links are alike, thus reducing the number of differing parts that have to be manufactured and simplifying the problem of spares and replacements.

In the alternative arrangement illustrated in Figures 6 to 10 inclusive, the rotor support takes the form of a pylon having a plurality of upwardly converging legs 66 joined at their upper ends by an apex member 67. This member has a pair of spaced upstanding and apertured ears 68 having recesses adapted to receive bearings 69 in which the transverse tilting pivot 70 is carried. This pivot, in turn, carries a member 71 which is rigid with the fore and aft tilting pivot 72 journaled as by bearings 73 mounted in recesses formed in bosses 74 formed in the walls of the spindle or axle member 75.

As best seen in Figure 6, the axis member 75 projects above the tilting pivot assembly as well as below this assembly, the lower end constituting a means for attachment of the control tube 76 whereby the rotor hub may be tilted in any direction for control purposes. The rotor hub part 77 is mounted for rotation about the upper end of spindle 75 by means of bearings 78. In this instance the hub structure takes a somewhat different form. Instead of a depending cylindrical portion (such as shown at 28 in Figure 1), the hub part 77 has a pair of depending boxes 79 attached thereto, these being of construction similar to the brackets 36 of Figure 1 within which the flapping pivot assemblies are mounted.

From examination of Figures 6, 7 and 9, it will be seen that the flapping pivots and the tilting pivots are all located in the same plane and further that the axes of all of these pivots intersect the axis of the hub. Heretofore, primarily because of the forward and lateral shift of the rotor thrust line away from the rotor axis, it has been important to locate the tilting pivot axes at substantial offsets from the central axis of rotation of the rotor, at least where a freely movable rotor control system (that is, one which is not irreversible) has been employed, as in the aforementioned application Serial No. 645,985, but the present invention makes it feasible to locate the tilting pivot for lateral control, and even the tilting pivot for longitudinal control (as here shown) in positions to intersect the hub axis, so as to obtain a simpler and more compact rotor head. The reasons for this are: that the location of the flapping pivots in position to intersect the hub axis, and the location of the tilting pivots in the same plane with the flapping pivots, results in greatly minimizing the excursions of the rotor lift line; the location of the flapping pivots on the rotor center also reduces the inherent stability of the rotor per se and thus the stiffness of the control; and the floating bushing or multi-bearing arrangement at the flapping pivots minimizes the frictional loads and vibration.

A driven internally toothed ring gear 80 may also be employed in this form of construction for purposes of driving the rotor, this gear being supported as by studs 81 at the lower edge of the bearing boxes 79—79. In addition, further support for the ring gear may be provided by additional depending brackets 82—82, best seen in Figures 9 and 10. A driving pinion 83 is adapted to be meshed with the ring gear upon extreme forward tilting of the rotor hub, as in the arrangement of Figures 1 to 3.

If desired, a tachometer drive connection 84 may also be coupled with the ring gear, the same being supported in constant engagement with this gear by virtue of the bracket 85 mounted on the control column 76. Thus a common element, in this instance the ring gear, is utilized both to receive the rotor driving torque and to impart rotation to the tachometer drive, the mounting of the two drives, however, being such that the tachometer driving connections are mounted to move with the tiltable rotor so as to be constantly operative, whereas the power driving connections to the rotor are mounted on the pylon and engage with the ring gear only when the rotor is tilted beyond the normal range of control movement.

A modified form of rotor brake is also incorporated in this arrangement, this brake being of the internal expanding type and comprising a drum 86 attached as by bolts 87 to the bearing boxes 79 and the brackets 82 (see Figures 9 and 10). As seen in Figure 8, the brake includes a pair of shoes 88 pivoted to each other at 89 and adapted to be spread by cam 90 in a well known manner, the cam being controlled by lever 91. The pivot 89, cam 90 and lever 91 may all conveniently be supported on a plate 92 which is carried by the control column 76.

In instances where it is desired to employ a drag pivot (in addition to the flapping pivot) located closely adjacent to the axis of the hub, we prefer to use a structure of the type illustrated in Figures 11 to 14 inclusive. In this arrangement, a pair of spaced inverted V-struts 93 are employed to support a gimbal ring assembly which is arranged to receive the transverse and longitudinal pivots by means of which the rotor hub may be tilted in all directions for control purposes. Toward the top of the spaced V-struts which constitute the fixed support, a pair of trunnions 94 are provided, these trunnions cooperating with pivots 95 mounted in the outer ring 96 of the gimbal assembly. From Figures 11 and 12, it will be seen that the pivots 95 provide an axis for tilting movement which is slightly forwardly offset with respect to the axis of rotation of the hub. The inner ring 97 of the gimbal assembly is pivotally joined with the outer ring 96 by means of diametrically opposite pivots 98 which provide the tilting pivot axis on which the rotor hub may be tilted laterally of the craft for control purposes in that sense.

Rigid with the inner ring 97 and depending therefrom is a conical structure 99 which terminates in a cylindrical part 100 constituting a non-rotative sleeve within which the rotative spindle 101 is mounted as by bearings 102. This spindle is provided with a pair of upstanding and apertured ears 103 providing support for a floating hollow pin 104 which constitutes the intermediate member of the flapping pivot assembly (corresponding in function to the floating sleeves 38 of the pivot assemblies illustrated in Figures 1 to 10 inclusive).

The blades 105 (see Figure 14) are mounted on this central flapping pivot assembly by means of goose-necked members 106, these members being so formed so as to clear the gimbal ring assembly and still provide for location of the flapping pivot assembly in the plane of the tilting pivots provided by the gimbal rings. The inner end of each member 106 is journaled as by conical bearings 107 in a housing 108, one of which (at the left in Figure 12) is provided with a single apertured lug 109 mounted on the floating pin 104. The other housing 108 is provided with a pair of spaced and apertured lugs 110 embracing the single lug 109 and also mounted on the floating pin 104.

The arrangement described above thus provides symmetrical distribution of the bearing surfaces of a pair of blades with respect to the floating pin 104, and the centrifugal loads are neutralized in this floating intermediate member (104) as in the arrangement first described. In addition, this structure also locates the drag pivots provided at the inner ends of the goose-necked members 106 closely adjacent to the rotational axis of the rotor as well as to the flapping pivot assembly. It will be further seen that the axis 106a of the drag articulation extends upwardly at an outward inclination, for purposes of blade pitch variation for effecting take-off in the manner set forth in British Patent No. 420,322 and the corresponding United States application No. 738,349, filed August 3rd, 1934.

For purposes of control of the position of tilt of the rotor, we employ an arm 111 attached to the conical part 99 and provided with a ball member 112 for connection with a suitable control system. This arm 111 may also serve to support an additional bracket 113 for a tachometer drive connection 114 associated with the lower end of the rotative spindle 101.

For the purpose of driving the rotor, the spindle 101 may be provided with an externally toothed bevel gear 115 with which pinion 116 is adapted to mesh, the latter being mounted on a shaft 117 journaled at its upper end as by bearings 118 in a suitable bearing box 119 which is supported on the cylindrical part 100 in which the rotor axle 101 is mounted. The inner face of the gear 115 serves as a brake drum adapted to cooperate with an internal expanding brake indicated at 120, in view of which arrangement a single element, namely gear 115, serves a double function. This particular embodiment is well adapted for driving the rotor from the rear, as in a pusher type machine; the driving connection 117 and associated parts being located behind the rotor axis, while the offset of the longitudinal control fulcrum 95 is, as usual, toward the front of the axis, and the control arm 111 is also located at the front, all of which further assists in rendering the entire rotor head very compact.

As seen in Figure 14, friction damper devices 121, for damping the oscillations of the blades on their drag pivots, may be carried from the drag link housings 108 by brackets 122, their movable arms 123 being coupled by links 124 to the goose-necked members 106. With respect to this type of damper, attention is called to the fact that the general arrangement and various features thereof are described and claimed in copending application of Harold F. Pitcairn, Serial No. 126,545, filed February 19, 1936, and assigned to the assignee of this application.

Support devices 125 may be mounted on the rotative spindle 101 between the upstanding ears 103 in position to abut the drag pivot assembly upon downward movement of the blades on their flapping pivots. The blades are thus conveniently supported in cantilever fashion when at rest.

In the embodiment shown in Figure 15 the same result as regards balancing the centrifugal loads of opposite blades without imposing them on the hub structure and eliminating the transmission to the hub structure of vertical impulses due to flapping is obtained in a slightly different way.

In this case the rotor axle member 201 carries by means of bearings 202, 203 the hub member 204. As before brackets 205 are formed integrally with the hub member for carrying the divided flapping pivot assembly of which one side only is shown. Each bracket 205 is formed as a housing in which is carried the main transverse flapping pin 206. The pin 206 carries a pair of taper roller bearings 207 on which is rotatable a sleeve 208 located between the jaws of the housing member 205.

As before the drag link members are of yoke-shaped form (although this is not shown in the drawings) and the inner ends of the drag links are bored to embrace the sleeve 208. In this instance both drag links have single ends one lying within the other, the same being shown at 209, 212. One of the drag link ends, namely, 209 is rigidly secured to the sleeve 208 by means of a ring nut 210 while the other drag link end 212 is rotatable on the sleeve 208 being mounted by means of a taper roller bearing 211.

It will therefore be seen that the centrifugal load of one blade is transmitted by the drag link end 212 of that blade to the sleeve 208 and is neutralized by the centrifugal load of the opposite blade whose drag link 209 is solid with the sleeve 208 and that no centrifugal load is transmitted by the bearings 207 to the flapping pin 206. Thus the only frictional forces transmitted to the pin 206 and the hub 204, 205 are those due to the residual thrust and transverse force which are substantially constant.

As before the rotor axle is mounted by means of a universal pivotal assembly for rotor tilting purposes, the axes of the tilting pivot assembly being situated in the plane perpendicular to the axis of rotation and containing the axis of the divided flapping pivot assembly, namely, the axis of the pins 206. The rotor tilting pivot assembly is contained within the hollow axle member 201 and is incompletely indicated in the drawings being similar in its general arrangement to those shown in Figures 1–10; one of the pivots of the universal pivot assembly for rotor tilting is indicated at 213.

We claim:

1. In an aircraft sustaining rotor of the kind referred to including a rotatable hub part, a pivot assembly for blade flapping as herein defined, common to a pair of oppositely disposed blades and including an intermediate bearing member freely rotatable with respect to the hub part and on which intermediate member the blade root members are rotatably mounted for independent flapping movement.

2. In a multi-bladed aircraft sustaining rotor having a rotative hub part, a flapping pivot assembly for a plurality of blades, the assembly including a pivot device rotatively mounted on the hub part, and the blades being rotatively mounted on said device.

3. In a multi-bladed aircraft sustaining rotor, a rotative hub part, a pivot device for blades of the rotor, the pivot device being rotatively mounted on the hub part, and the blades being rotatively mounted on said device.

4. In a multi-bladed aircraft sustaining rotor, a rotative hub part, a pivot device for blades of the rotor, the pivot device being rotatively mounted on the hub part, and the blades being rotatively mounted on said device, the bearing areas for the several blades mounted on said device being arranged with the mid points of the axial lengths thereof coincident.

5. In a multi-bladed aircraft sustaining rotor, a rotative hub part, a pivot device for blades of the rotor, the pivot device being rotatively mounted on the hub part, rolling bearing elements interposed between said device and the hub part, and the blades being rotatively mounted on said device.

6. In a multi-bladed aircraft sustaining rotor, a rotative hub part, a pivot device for blades of the rotor, the pivot device being rotatively mounted on the hub part, rolling bearing elements interposed between said device and the hub part, the blades being rotatively mounted on said device, and rolling bearing elements interposed between said device and the blades.

7. An aircraft sustaining rotor including a rotative hub part, pivot means providing for tilting of the hub part for control purposes, a pair of yoke-shaped members constituting blade root fittings for a pair of opposed blades, the yoke-shaped members embracing the hub, a pair of pivot assemblies at opposite sides of the hub constituting a divided flapping pivot common to both opposed yoke-shaped members, each assembly including a floating member intermediate the yoke-shaped members and the hub part.

8. An aircraft sustaining rotor including a rotative hub part, pivot means providing for tilting of the hub part for control purposes, a pair of yoke-shaped members constituting blade root fittings for a pair of opposed blades, the yoke-shaped members embracing the hub, a pair of pivot assemblies at opposite sides of the hub constituting a divided flapping pivot common to both opposed yoke-shaped members, each assembly including a floating member intermediate the yoke-shaped members and the hub part, the pivot means providing for tilting of the rotor being located between the two assemblies of the divided flapping pivot.

9. An aircraft sustaining rotor construction including in combination with a fixed support, a gimbal ring assembly the outer element of which is pivoted on said support, a rotative hub part rotatably carried by the inner element of the said assembly, and pivot devices for attaching blades to the rotative hub part at a point closely adjacent to the rotational axis of the rotor, the pivot devices being located within the gimbal ring assembly.

10. An aircraft sustaining rotor construction including in combination with a fixed support, a gimbal ring assembly the outer element of which is pivoted on said support, a rotative hub part rotatably carried by the inner element of said assembly, and pivot devices for attaching blades to the rotative hub part at a point closely adjacent to the rotational axis of the rotor, the pivot devices being located within the gimbal ring assembly with their axes lying substantially in the plane of the pivot elements of said assembly.

11. An aircraft sustaining rotor construction including in combination with a fixed support, a gimbal ring assembly the outer element of which is pivoted on said support, a rotative hub part rotatably carried by the inner element of said assembly, pivot devices for attaching blades to the rotative hub part at a point closely adjacent to the rotational axis of the rotor, the pivot devices being located within the gimbal ring assembly, and goose-necked fittings at the root ends of the blades joining the pivot devices and the blades and configured to support the blades substantially in the plane of the elements of said assembly.

12. An aircraft sustaining rotor construction including in combination with a fixed support, a gimbal ring assembly the outer element of which is pivoted on said support, a rotative hub part rotatably carried by the inner element of said assembly, and pivot devices for attaching blades to the rotative hub part at a point closely adjacent to the rotational axis of the rotor, the pivot devices being located within the gimbal ring assembly and including parts providing a flapping pivot and a drag pivot for each blade.

13. A multi-bladed aircraft sustaining rotor including a rotative hub part, a flapping pivot assembly for a plurality of blades including a pin fixed on the hub part, and a sleeve or bushing rotatably mounted on said pin, the blades being rotatably mounted on said sleeve.

14. A multi-bladed aircraft sustaining rotor including a rotative hub part, a flapping pivot assembly including a pivot member journaled toward its ends in the hub part by external bearings, and a plurality of blade root members rotatably mounted on the outer surface of the pivot member intermediate the said external bearings.

15. An aircraft sustaining rotor including a rotative hub part, a pair of yoke-shaped members constituting blade root fittings for a pair of opposed blades, the yoke-shaped members embracing the hub, a pair of pivot assemblies at opposite sides of the hub constituting a divided flapping pivot common to both opposed yoke-shaped members, one of the yoke-shaped members having bifurcated ends and the other having single ends fitting between the elements of said bifurcated ends, and all of said ends being apertured to cooperate with the flapping pivot assemblies.

16. An aircraft sustaining rotor including a rotative hub part, a pair of yoke-shaped members constituting blade root fittings for a pair of opposed blades, the yoke-shaped members embracing the hub, a pair of pivot assemblies at opposite sides of the hub constituting a divided flapping pivot common to both opposed yoke-shaped members, each of said members having one bifurcated end and one single end, and the two members being relatively inverted in position with the single end of one received between the parts of the bifurcated end of the other and vice versa, and all of said ends being apertured to cooperate with the flapping pivot assemblies.

17. An aircraft sustaining rotor including a rotative hub part providing a generally upright axis for the rotor, pivot means having an axis intersecting said upright axis and providing for tilting of the hub part for control purposes, and sustaining blades pivoted to said hub part on an axis intersecting said upright axis, the pivot means for mounting the blades including a pivot device rotatively mounted on the hub part, the blades being rotatively mounted on said device.

18. In an aircraft, a sustaining rotor having autorotationally actuable sustaining blades, a fixed support, a spindle, a universal joint for mounting said spindle on the fixed support in a position projecting upwardly, the universal joint including a pair of pivot pins arranged at an angle to each other, a rolling bearing for mounting one of said pins on said support, a rolling bearing mounting the spindle on the other of said pins, a rotatable hub part journaled on said spindle and having portions projecting downwardly at the sides of the universal joint, the sustaining blades being pivoted to said portions substantially in the plane of said universal joint.

19. In an aircraft sustaining rotor of the kind referred to including a rotatable hub part, a pivot assembly for blade flapping as herein defined, common to a pair of oppositely disposed blades and including a member freely rotatable with respect to the hub part and on which member one at least of the oppositely disposed blade root members is rotatably mounted for independent flapping movement.

20. In a multi-bladed aircraft sustaining rotor having a rotative hub part, a flapping pivot assembly for a plurality of blades, the assembly including a pivot device rotatively mounted on the hub part, and at least one of the blades being rotatively mounted on said device.

21. In a multi-bladed aircraft sustaining rotor, a rotative hub part, a pivot device for blades of the rotor, the pivot device being rotatively mounted on the hub part, and at least one of the blades being rotatively mounted on said device.

22. In a multi-bladed aircraft sustaining rotor, a rotative hub part, a pivot device for blades of the rotor, the pivot device being rotatively mounted on the hub part, rolling bearing elements interposed between said device and the hub part, and at least one of the blades being rotatively mounted on said device.

23. In a multi-bladed aircraft sustaining rotor, a rotative hub part, a pivot device for blades of the rotor, the pivot device being rotatively mounted on the hub part, rolling bearing elements interposed between said device and the hub part, at least one of the blades being rotatively mounted on said device, and rolling bearing elements interposed between said device and the blade or blades rotatively mounted thereon.

24. An aircraft sustaining rotor including a rotative hub part, pivot means providing for tilting of the hub part for control purposes, a pair of yoke-shaped members constituting blade root fittings for a pair of opposed blades, the yoke-shaped members embracing the hub, a pair of pivot assemblies at opposite sides of the hub constituting a divided flapping pivot common to both opposed yoke-shaped members, each assembly including a pivot device rotatable on the hub part and rotatable relatively to one at least of the yoke-shaped members.

25. An aircraft sustaining rotor including a rotative hub part, pivot means providing for tilting of the hub part for control purposes, a pair of yoke-shaped members constituting blade root fittings for a pair of opposed blades, the yoke-shaped members embracing the hub, a pair of pivot assemblies at opposite sides of the hub constituting a divided flapping pivot common to both opposed yoke-shaped members, each assembly including a pivot device rotatable on the hub part and rotatable relatively to one at least of the yoke-shaped members, the pivot means providing for tilting of the rotor being located between the two assemblies of the divided flapping pivot.

26. A multi-bladed aircraft sustaining rotor including a rotative hub part, a flapping pivot assembly for a plurality of blades including a pin fixed on the hub part, and a sleeve or bushing rotatably mounted on said pin, one at least of the blades being rotatably mounted on said sleeve.

27. An aircraft sustaining rotor including a rotative hub part providing a generally upright axis for the rotor, pivot means having an axis intersecting said upright axis and providing for tilting of the hub part for control purposes, and sustaining blades pivoted to said hub part on an axis intersecting said upright axis, the pivot means for mounting the blades including a pivot device rotatively mounted on the hub part, at least one of the blades being rotatively mounted on said device.

28. A multi-bladed aircraft sustaining rotor including a rotative hub part, a flapping pivot assembly for a pair of oppositely disposed blades including a pin fixed on the hub part, and a sleeve or bushing rotatably mounted on said pin, one of the blades being rotatably mounted on said sleeve and the other blade being fixed to or solid with said sleeve.

29. In a multi-bladed aircraft sustaining rotor, a rotative hub part, a rotor blade rotatively mounted on said hub part and a rotor blade rotatively mounted on the first named rotor blade, said last named blade being disposed oppositely to the first named blade.

30. In a multi-bladed aircraft sustaining rotor having a rotative hub part, a flapping pivot assembly for a pair of oppositely disposed blades, the assembly including a blade root part for one of the blades rotatively mounted on the hub part and a blade root part for the other blade rotatively mounted on the first named blade root part.

31. In a multi-bladed aircraft sustaining rotor having a rotative hub part, a pivot assembly for a plurality of blades, the assembly including a pivot device solid with one of the blades and rotatively mounted on the hub part, and the remaining blades being rotatively mounted on said pivot device.

32. In an aircraft sustaining rotor having a hub part, a flapping pivot assembly for a pair of opposite blades including blade-interconnecting means constituting a load transmitting connection between the roots of the opposite blades, said means being rotatively mounted on the hub part and rotatable relatively to one at least of the blades.

33. In an aircraft sustaining rotor, a rotor head construction comprising an upright non-rotative support, a rotatable hub, mounting mechanism for said support providing for universal tilting thereof, pivot mechanism for securing rotor blades upon the hub, said tilting mounting mechanism and said pivot mechanism being located in a common horizontal plane, and a plurality of vertically spaced-apart anti-friction bearing devices interposed between the non-rotative support and the rotatable hub, and axially offset to one side of said horizontal plane, whereby said hub is rotatably mounted on said support over a substantial axial dimension thereof, while at the same time the tilting mounting mechanism and blade pivot mechanism are retained within minimum radial dimensions.

JAMES ALLAN JAMIESON BENNETT.
FREDERICK LEIGHTON HODGESS.